US010055871B2

(12) United States Patent
Greenberger et al.

(10) Patent No.: US 10,055,871 B2
(45) Date of Patent: Aug. 21, 2018

(54) APPLYING AN IMAGE OVERLAY TO AN IMAGE BASED ON RELATIONSHIP OF THE PEOPLE IDENTIFIED IN THE IMAGE

(71) Applicant: International Business Machines Corporation, Armonk, NY (US)

(72) Inventors: Jeremy A. Greenberger, Raleigh, NC (US); Jana H. Jenkins, Raleigh, NC (US); Nicholas R. Sandonato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/291,608

(22) Filed: Oct. 12, 2016

(65) Prior Publication Data

US 2018/0101973 A1  Apr. 12, 2018

(51) Int. Cl.
*G06T 11/60* (2006.01)
*G06K 9/00* (2006.01)

(52) U.S. Cl.
CPC .......... *G06T 11/60* (2013.01); *G06K 9/00288* (2013.01)

(58) Field of Classification Search
CPC ............................ G06T 11/60; G06K 9/00288
USPC ........................................................ 345/632
See application file for complete search history.

(56) References Cited

U.S. PATENT DOCUMENTS

| | | | |
|---|---|---|---|
| 5,838,336 A * | 11/1998 | Ross | G09G 5/14 345/162 |
| 7,106,887 B2 | 9/2006 | Kinjo | |
| 7,370,343 B1 * | 5/2008 | Ellis | H04N 5/44543 348/E5.105 |
| 8,666,198 B2 | 3/2014 | Shochat et al. | |
| 8,681,257 B2 | 3/2014 | Murase | |
| 8,689,103 B2 | 4/2014 | Lindley et al. | |
| 8,837,787 B2 | 9/2014 | Brookhart | |
| 9,275,016 B1 * | 3/2016 | Freund | G06F 17/211 |
| 9,317,530 B2 | 4/2016 | Papakipos et al. | |
| 2009/0003662 A1 | 1/2009 | Joseph et al. | |
| 2012/0117473 A1 | 5/2012 | Han et al. | |

(Continued)

OTHER PUBLICATIONS

Heath, Alex, "I tried Snapchat's trippy new selfie filters and found some other big changes", Sep. 15, 2015, Business Insider, pp. 1-9, URL:<http://www.businessinsider.com/snapchats-new-selfie-filters-2015-9/#the-way-you-enable-snapchats-lenses-is-a-little-tricky-when-your-phones-selfie-camera-is-enabled-just-tap-and-hold-on-your-face-1>.*

(Continued)

*Primary Examiner* — Barry Drennan
*Assistant Examiner* — Terrell Robinson
(74) *Attorney, Agent, or Firm* — Yee & Associates, P.C.; Richard Wilhelm

(57) ABSTRACT

Applying an image overlay to an image is provided. A relationship type and a relationship strength between two or more people identified in a first image is determined based on profile data corresponding to each of the two or more people and a set of data elements determined to be common to the profile data corresponding to each of the two or more people. An image overlay is selected to apply to the first image based on the relationship type and the relationship strength between the two or more people and the set of data elements determined to be common to the profile data corresponding to each of the two or more people. The image overlay is applied to the first image generating a second image that includes the first image and the applied image overlay.

10 Claims, 7 Drawing Sheets

(56) References Cited

U.S. PATENT DOCUMENTS

| | | | | |
|---|---|---|---|---|
| 2013/0326330 | A1* | 12/2013 | Harris | G06F 17/2288 |
| | | | | 715/234 |
| 2013/0329060 | A1 | 12/2013 | Yim | |
| 2015/0100880 | A1 | 4/2015 | Matas et al. | |
| 2015/0113661 | A1 | 4/2015 | Mishra | |
| 2015/0131872 | A1 | 5/2015 | Ganong et al. | |
| 2016/0070954 | A1 | 3/2016 | Barak et al. | |
| 2016/0125270 | A1 | 5/2016 | Gokturk et al. | |
| 2016/0261927 | A1* | 9/2016 | Smolic | H04N 21/8133 |
| 2017/0032554 | A1* | 2/2017 | O'Donovan | G06N 7/005 |

OTHER PUBLICATIONS

"Image Overlay: Combining Images Together In-Camera", Nikon Inc., copyright 2016, 2 pages. Accessed Aug. 10, 2016, http://www.nikonusa.com/en/learn-and-explore/article/ga5bvjav/image-overlay-combining-images-together-in-camera.html.

"On-Demand Geofilters", Snap Inc., copyright 2016, 3 pages. Accessed Aug. 10, 2016, https://www.snapchat.com/on-demand.

"Using Person Profile Database and Algorithm to Use Context to Enhance Face Recognition in Photos", IP.com Prior Art Database Technical Disclosure No. IPCOM000204209D, Feb. 18, 2011, 4 pages.

Stone et al. "Autotagging Facebook: Social Network Context Improves Photo Annotation", IEEE Computer Society conference on Computer Vision and Pattern Recognition Workshops (CVPRW '08), Jun. 2008, 8 pages.

Tweedie, "Everyone Can Use Snapchat's New Geofilters Starting Today—Here's How They Work", Business Insider, Dec. 2, 2014, 4 pages. http://www.businessinsider.com/how-to-use-snapchat-geofilters-2014-12.

Nei et al. "Photo Linker: A System for Finding Your Old Photos Based on Fragmentary Memories", Proceedings of the 7th International Conference on Internet Multimedia Computing and Service (ICIMCS '15), Aug. 2015, 5 pages.

* cited by examiner

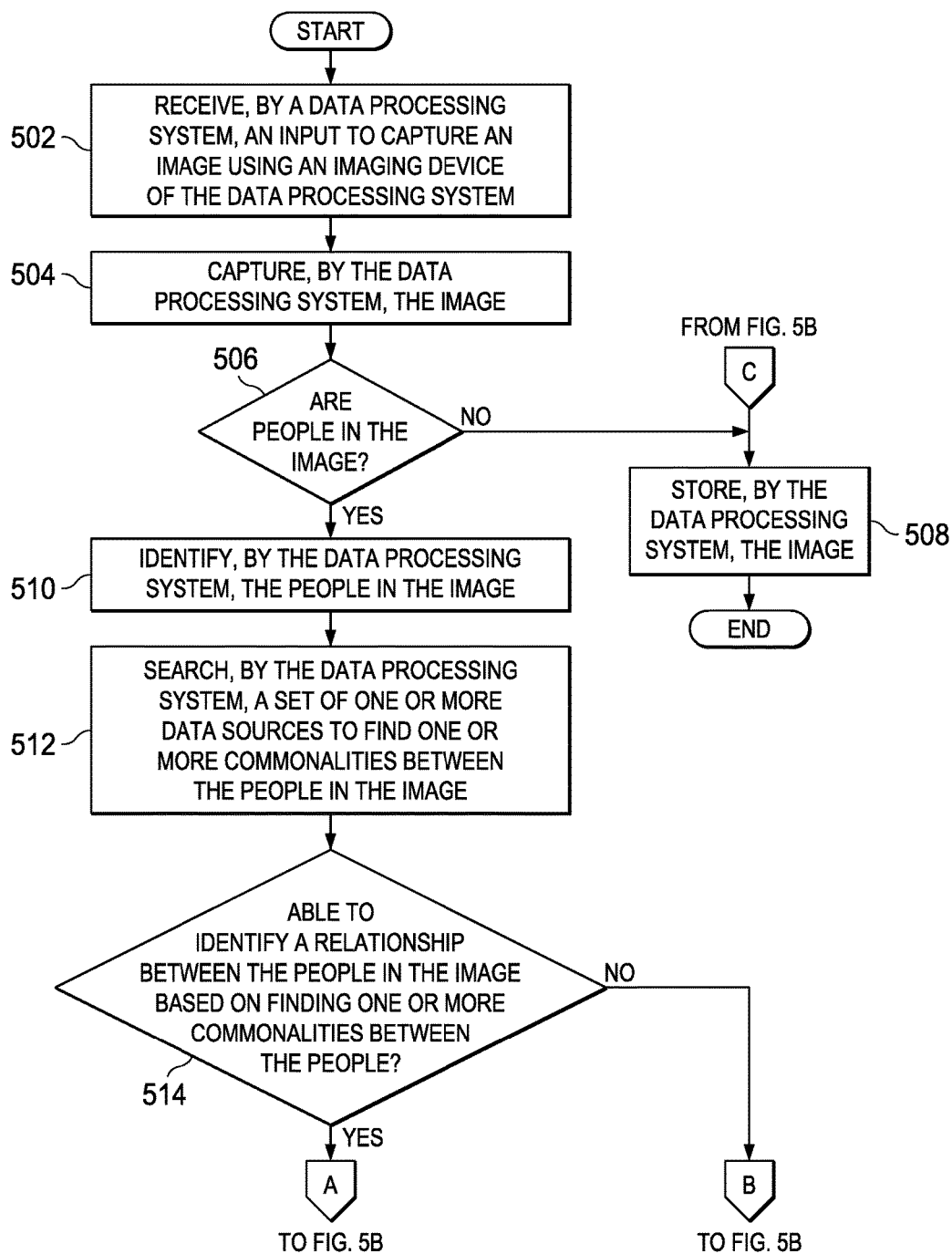

APPLYING AN IMAGE OVERLAY TO AN IMAGE BASED ON RELATIONSHIP OF THE PEOPLE IDENTIFIED IN THE IMAGE

BACKGROUND

1. Field

The disclosure relates generally to image processing and more specifically to selecting, recommending, and applying an image overlay to an image based on a relationship between the people identified in the image.

2. Description of the Related Art

In various social media applications, users are able to post their photographs online. In addition, various social media applications may provide a user profile to identify persons that the user knows and how a user is associated with another person.

SUMMARY

According to one illustrative embodiment, a computer-implemented method for applying an image overlay is provided. A data processing system determines a relationship type and a relationship strength between two or more people identified in a first image based on profile data corresponding to each of the two or more people and a set of data elements determined to be common to the profile data corresponding to each of the two or more people. The data processing system selects an image overlay to apply to the first image based on the relationship type and the relationship strength between the two or more people and the set of data elements determined to be common to the profile data corresponding to each of the two or more people. The data processing system applies the image overlay to the first image generating a second image that includes the first image and the applied image overlay. According to other illustrative embodiments, a data processing system and computer program product for applying an image overlay are provided.

BRIEF DESCRIPTION OF THE DRAWINGS

FIGS. 5A-5B are a flowchart illustrating a process for applying an image overlay to an image in accordance with an illustrative embodiment.

DETAILED DESCRIPTION

Figure 1:
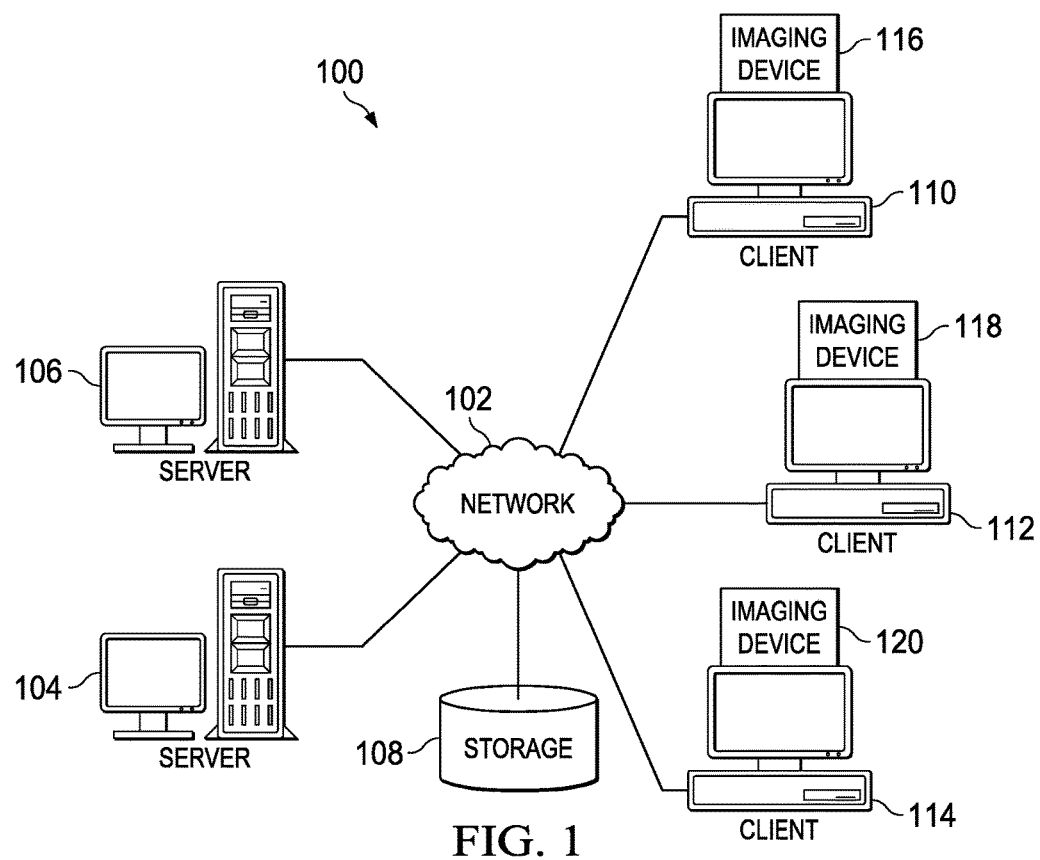
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
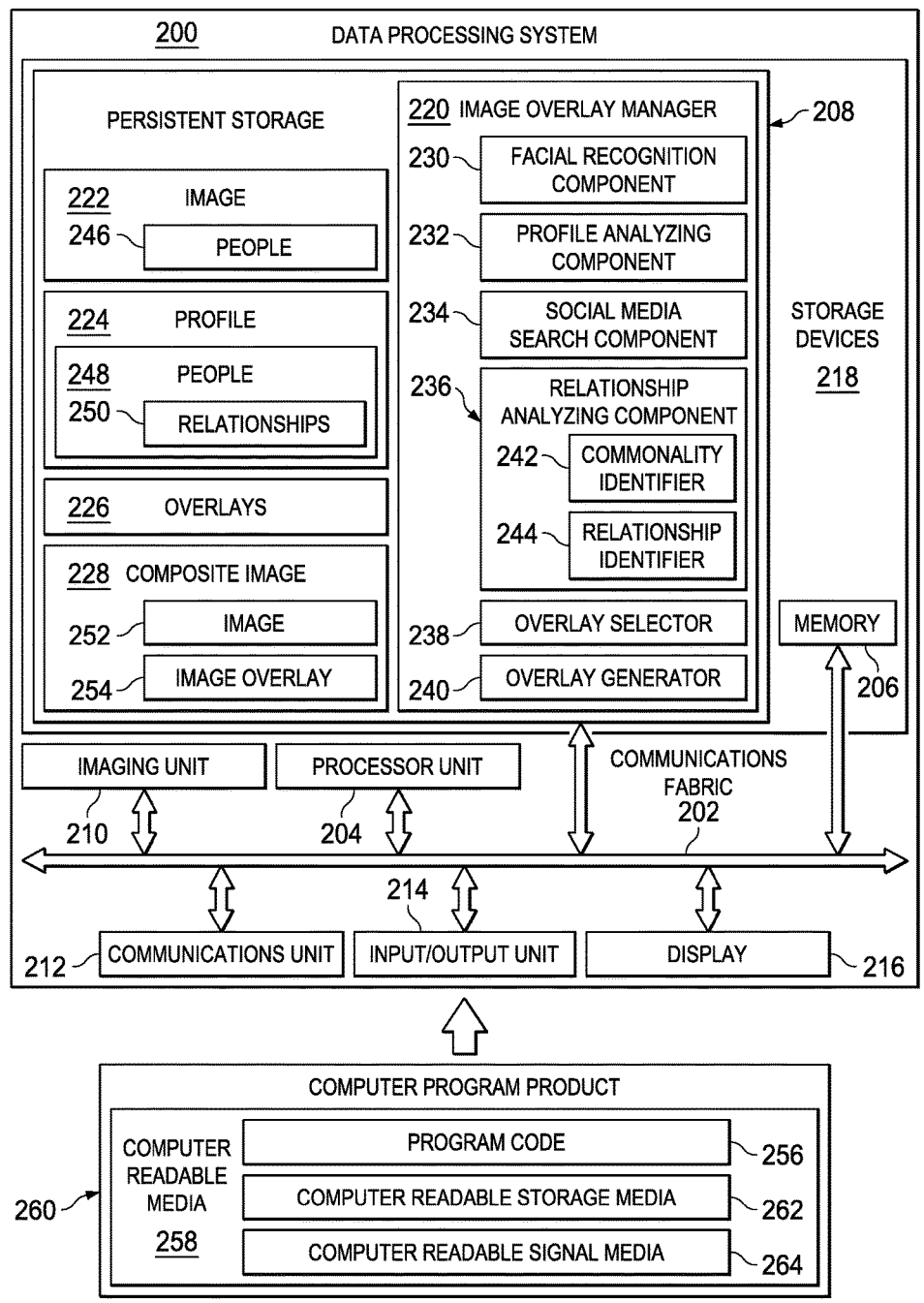
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. Server 104 and server 106 may provide a set of one or more services to registered users of client devices connected to network 102. For example, server 104 and server 106 may provide a set of social media services to a plurality of registered users. Also, it should be noted that server 104 and server 106 may represent a plurality of different servers hosting a plurality of different social media websites.

Client 110, client 112, and client 114 also connect to network 102. Clients 110, 112, and 114 are clients of server 104 and server 106. Further, server 104 and server 106 may provide information, such as boot files, operating system images, and software applications to clients 110, 112, and 114.

In this example, clients 110, 112, and 114 are illustrated as desktop or personal computers with wire or wireless communication links to network 102. However, it should be noted that clients 110, 112, and 114 are meant as examples only. In other words, clients 110, 112, and 114 may include other types of data processing systems, such as, for example, laptop computers, handheld computers, smart phones, cellular phones, smart watches, personal digital assistants, gaming devices, kiosks, set top boxes, cameras, and the like. Registered users of clients 110, 112, and 114 may utilize clients 110, 112, and 114 to access the social media services provided by server 104 and server 106.

Further, users of clients 110, 112, and 114 may utilize client 110, client 112, and client 114 to capture images using imaging device 116, imaging device 118, and imaging device 120, respectively. Imaging devices 116, 118, and 120 may be an integral part of clients 110, 112, and 114 or may be coupled to clients 110, 112, and 114. Each of imaging devices 116, 118, and 120 may be, for example, a camera capable of capturing images. The images may be, for example, still photographs and video clips.

Furthermore, clients 110, 112, and 114 may select, recommend, and apply image overlays to captured images. An image overlay is a decorative layer of textual content and/or graphical content added to a captured image to create a composite image comprising the original captured image and the applied image overlay. The textual content may be, for example, "I love my best friend" and the graphical content may be, for example, a "♥". Clients 110, 112, and 114 may select, recommend, and apply image overlays based on clients 110, 112, and 114 identifying people in a captured image. Clients 110, 112, and 114 may utilize, for example, facial recognition technology to identify the people in a captured image. Moreover, clients 110, 112, and 114 may access data posted on one or more social media websites and/or data stored in user profiles to identify relationships between the people in the captured image. Clients 110, 112, and 114 also may generate new image overlays by combining two or more stored image overlays. In addition, clients 110, 112, and 114 may generate new image overlays by removing textual content from or adding textual content to stored image overlays, along with graphical content.

Storage 108 is a network storage device capable of storing any type of data in a structured format or an unstructured format. In addition, storage 108 may represent a set of one or more network storage devices. Storage 108 may store, for example, names and identification information for a plurality of different registered users; profiles corresponding to each of the registered users; images captured by the plurality of registered users; image overlays to be applied to captured images; history of image overlay selections by each of the registered users; et cetera. Further, storage 108 also may store other data, such as authentication or credential data that may include user names, passwords, and biometric data associated with the plurality of different registered users, for example.

In addition, it should be noted that network data processing system 100 may include any number of additional server devices, client devices, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a data processing system, such as client 110 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, imaging unit 210, communications unit 212, input/output unit 214, and display 216.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 218. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores image overlay manager 220, image 222, profile 224, overlays 226, and composite image 228. Image overlay manager 220 selects, recommends, and applies image overlays to captured images based on image overlay manager 220 identifying relationships between people in the captured images. It should be noted that even though image overlay manager 220 is illustrated as residing in persistent storage 208, in an alternative illustrative embodiment image overlay manager 220 may be a separate component of data processing system 200. For example, image overlay manager 220 may be a hardware component coupled to communication fabric 202 or a combination of hardware and software components. In another alternative illustrative embodiment, image overlay manager 220 may be located in a server device, such as server 104 in FIG. 1. In a further alternative illustrative embodiment, a first set of components of image overlay manager 220 may be located locally in data processing system 200 and a second set of components may be located remotely in a server device.

In this example, image overlay manager 220 includes facial recognition component 230, profile analyzing component 232, social media search component 234, relationship analyzing component 236, overlay selector 238, and overlay generator 240. However, it should be noted that illustrative embodiments are not limited to such. In other words, image overlay manager 220 may include more or fewer components than illustrated.

Image overlay manager 220 utilizes facial recognition component 230 to identify people 246 in image 222. People 246 represent two or more individuals captured in image 222. Image 222 may be, for example, a photograph or a video.

Image overlay manager 220 utilizes profile analyzing component 232 to access and analyze the relationship and life event data contained in profile 224. Profile 224 represents a collection of data corresponding to a user of data processing system 200. The data contained in profile 224 may include, for example, names of people 248 that the user knows and is associated with. Profile 224 also includes relationships 250, which represent how the user is associated with people 248. For example, the user may identify a person in people 248 as a family member, such as a spouse, a child, a parent, or a grandparent, a friend, a best friend, a fiancé or fiancée, a co-worker, a classmate, a traveling companion, and the like. In other words, image overlay manager 220 utilizes profile analyzing component 232 to help identify the relationships between people 246 in image 222.

Image overlay manager 220 also utilizes social media search component 234 to help identify the relationships between people 246 in image 222. Social media search component 234 searches one or more social media websites to find relationship and life event data posted on the social media websites by people 246, which were identified by facial recognition component 230, in image 222. Image overlay manager 220 utilizes relationship analyzing component 236 to analyze the relationship and life event data found by profile analyzing component 232 in profile 224 and the relationship and life event data found by social media search component 234 in the social media websites.

In this example, relationship analyzing component 236 includes commonality identifier 242 and relationship identifier 244. Commonality identifier 242 determines data elements that are common to people 246 in image 222. Relationship identifier 244 determines a relationship type and a relationship strength between people 246 in image 222. In various illustrative embodiments, relationship strength may be determined from the length of time two persons have been associated, the number other persons the two persons have a common relationship with, the number of interactions between the two persons, a schedule of relationship strengths where the two persons have been explicitly identified by a user as having a particular relationship (e.g., a person identified as a spouse may be assigned a high relationship strength on the schedule while a person identified as being a member of a common organization may be assigned a low relationship strength), and other similar factors. In various illustrative embodiments, two persons may be explicitly identified by a user as having a particular relationship, such as, for example, sibling, spouse, family member, et cetera.

Image overlay manager 220 utilizes overlay selector 238 to analyze the output of relationship analyzing component 236 and select one or more image overlays from overlays 226. Overlays 226 represent a plurality of stored image overlays that may be applied to captured images, such as image 222, based on the relationship type and strength between people 246 and the data elements determined to be in common between people 246. Alternatively, image overlay manager 220 may utilize overlay generator 240 to analyze the output of relationship analyzing component 236 and generate a new image overlay for image 222 based on selected content from two or more different overlays in overlays 226.

Composite image 228 comprises image 252 and image overlay 254. Image 252 is the same as image 222. Image overlay manager 220 generates composite image 228 by combining image 252 with image overlay 254. After generating composite image 228, image overlay manager 220 displays composite image 252 in display 216 for review by the user of data processing system 200. Image overlay manager 220 also may include an accept element and a reject element in the display for selection by the user. If the user selects the accept element, then image overlay manager 220 saves composite image 228. If the user selects the reject element, then image overlay manager 220 removes image overlay 254 from image 252. After removing image overlay 254 from image 252, image overlay manager 220 selects and recommends a new set of image overlays for image 252.

Imaging unit 210 is a hardware device capable of capturing still and/or video images. Imaging unit 210 may be, for example, a camera. Also, it should be noted that imaging unit 210 may include a set of two or more imaging devices.

Communications unit 212, in this example, provides for communication with other computers, data processing systems, and devices via a network, such as network 102 in FIG. 1. Communications unit 212 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (WiFi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 214 allows for the input and output of data with other devices that may be connected to data processing system 200. For example, input/output unit 214 may provide a connection for user input through a keypad, keyboard, and/or some other suitable input device. Display 216 provides a mechanism to display information to a user and may include touch screen capabilities to allow the user to make on-screen selections through user interfaces or input data, for example. Display 216 also may display images, such as photographs and videos with or without image overlays, to the user.

Instructions for the operating system, applications, and/or programs may be located in storage devices 218, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 256 is located in a functional form on computer readable media 258 that is selectively removable and may be loaded onto or transferred to data processing system 200 for running by processor unit 204. Program code 256 and computer readable media 258 form computer program product 260. In one example, computer readable media 258 may be computer readable storage media 262 or computer readable signal media 264. Computer readable storage media 262 may include, for example, an optical or magnetic disc that is inserted or placed into a drive or other device that is part of persistent storage 208 for transfer onto a storage device, such as a hard drive, that is part of persistent storage 208. Computer readable storage media 262 also may take the form of a persistent storage, such as a hard drive, a thumb drive, or a flash memory that is connected to data processing system 200. In some instances, computer readable storage media 262 may not be removable from data processing system 200.

Alternatively, program code 256 may be transferred to data processing system 200 using computer readable signal media 264. Computer readable signal media 264 may be, for example, a propagated data signal containing program code 256. For example, computer readable signal media 264 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 256 may be downloaded over a network to persistent storage 208 from another device or data processing system through computer readable signal media 264 for use within data processing system 200. For instance, program code stored in a computer readable storage media in a data processing system may be downloaded over a network from the data processing system to data processing system 200. The data processing system providing program code 256 may be a server computer, a client computer, or some other device capable of storing and transmitting program code 256.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 262 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that a way to recommend image overlays to a user of a device capable of taking images based on the relationship of the people captured in an image does not exist. The prior art does not discuss selecting an image overlay from a database of possible overlay graphics based on the relationship of the people identified in an image, such as a photograph or video. Illustrative embodiments generate and/or recommend image overlays to be applied an image using retrieved information regarding the type and strength of relationship between the people that illustrative embodiments identify in the image.

Illustrative embodiments receive an image and perform an analysis to determine whether two or more people are captured in the image. If the image contains two or more people, then illustrative embodiments identify the people in the image. Illustrative embodiments may perform this identification using various technologies, such as, for example, facial recognition. Alternatively, illustrative embodiments may rely on manual identification of people in the image by a user. In addition, illustrative embodiments may attach the identification of people in the image as metadata to the image.

Subsequently, illustrative embodiments identify the relationship between the people identified in the image by retrieving relationship data from a set of one or more online social media sources and/or stored user profiles. The relationship data may include, for example, how long a friendship has lasted, how many friends the people have in common, whether the people are explicitly identified as family members or as a married couple, dates when life events, such as marriages, anniversaries, and birthdays, occur, locations where the people attended school or college, groups or organizations, such as scouts, the people are members of, and the like. Then, illustrative embodiments analyze the relationship data to determine the type and strength of the relationship between the people captured in the image. Afterward, illustrative embodiments generate and/or recommend image overlays for the user to select from based on identified relationships and life events.

Further, illustrative embodiments may determine whether too many or too few people exist in the image in order to apply an overlay. For example, if illustrative embodiments identify two siblings and one non-sibling in an image, then illustrative embodiments do not recommend a sibling-related overlay or if illustrative embodiments identify only one person in an image, then illustrative embodiments do not recommend a relationship-related overlay to the image. After the user selects a desired image overlay, then illustrative embodiments apply the selected image overlay to the image to generate a composite image. Furthermore, it should be noted that illustrative embodiments may apply an image overlay to a video. Moreover, illustrative embodiments may apply animated image overlays, which are actively in motion and not static, to images.

Figure 3:
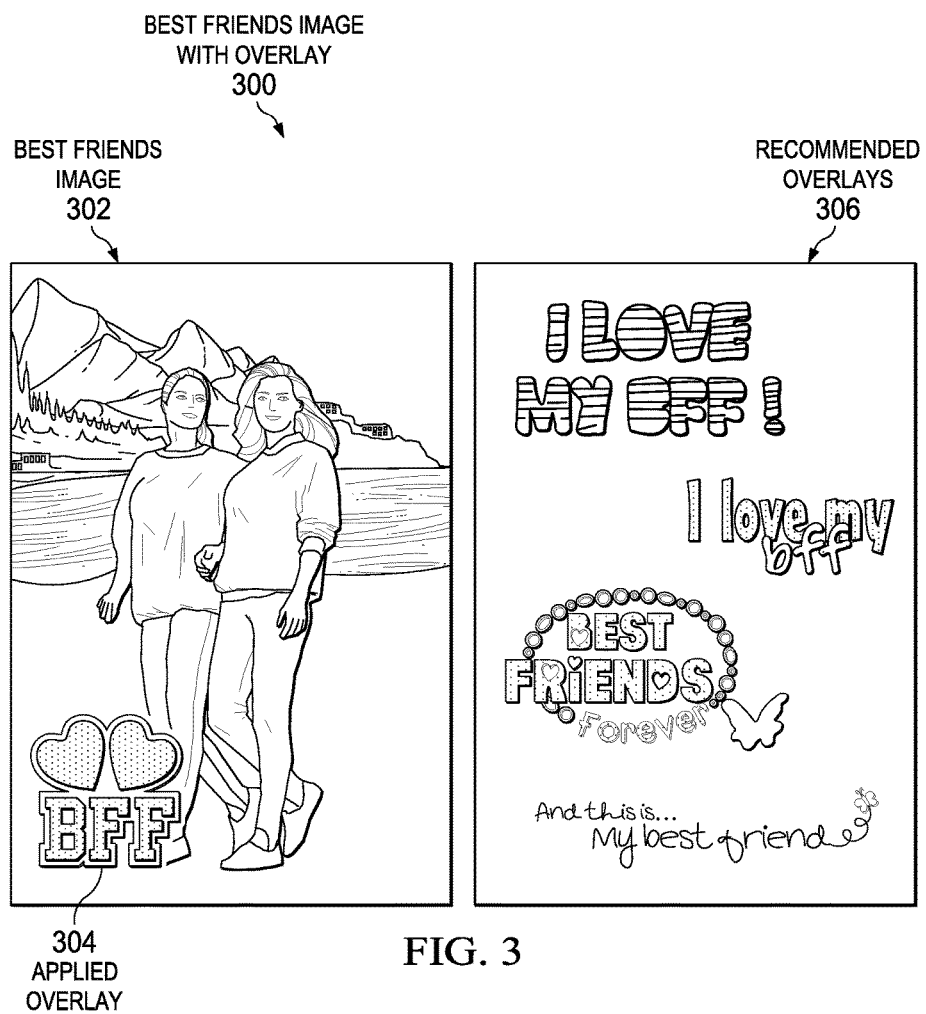
FIG. 3 is an example of a best friends image with overlay in accordance with an illustrative embodiment.

With reference now to FIG. 3, an example of a best friends image with overlay is depicted in accordance with an illustrative embodiment. Best friends image with overlay 300 may be, for example, composite image 228 in FIG. 2. In this example, illustrative embodiments receive an image capturing two people in the foreground. Illustrative embodiments identify the two people as best friends based on relationship data retrieved from online social media sources and/or stored user profiles. Illustrative embodiments then apply a best friends forever or "BFF" image overlay containing two heart graphics to the image. As a result, best friends image with overlay 300 includes best friends image 302 and applied overlay 304. However, the users may not like applied overlay 304 and reject its application to best friends image 302. Consequently, illustrative embodiments remove applied overlay 304 from best friends image 302 and display recommended overlays 306 to the users for selection and application to best friends image 302.

Figure 4:
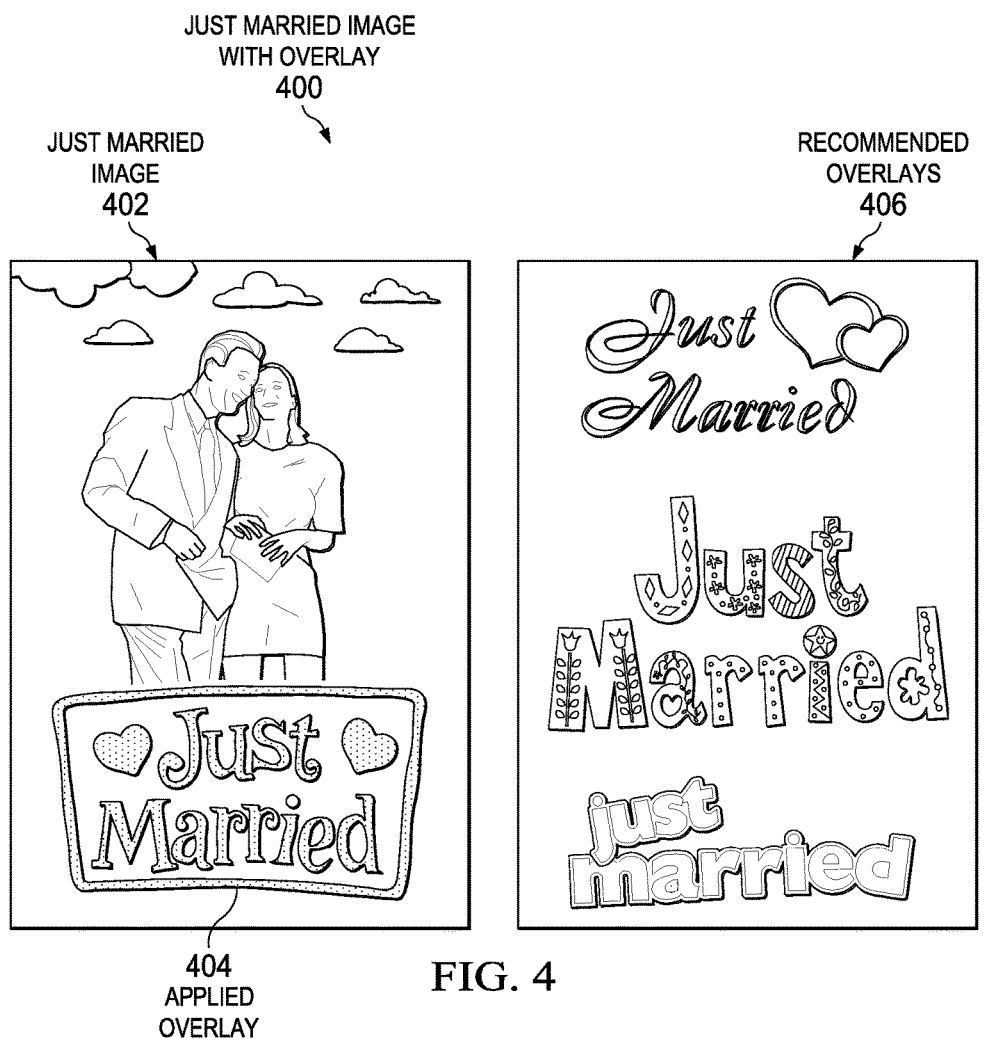
FIG. 4 is an example of a just married image with overlay in accordance with an illustrative embodiment.

With reference now to FIG. 4, an example of a just married image with overlay is depicted in accordance with an illustrative embodiment. Just married image with overlay 400 may be, for example, composite image 228 in FIG. 2. In this example, illustrative embodiments receive an image capturing two people. Illustrative embodiments identify the two people as a just recently married couple based on life event data retrieved from online social media sources and/or stored user profiles. Illustrative embodiments then apply a just married image overlay containing two heart graphics to the image. As a result, just married image with overlay 400 includes just married image 402 and applied overlay 404. However, the users may not like applied overlay 404 and reject its application to just married image 402. Consequently, illustrative embodiments remove applied overlay 404 from just married image 402 and display recommended overlays 406 to the users for selection and application to just married image 402.

Figure 5B:
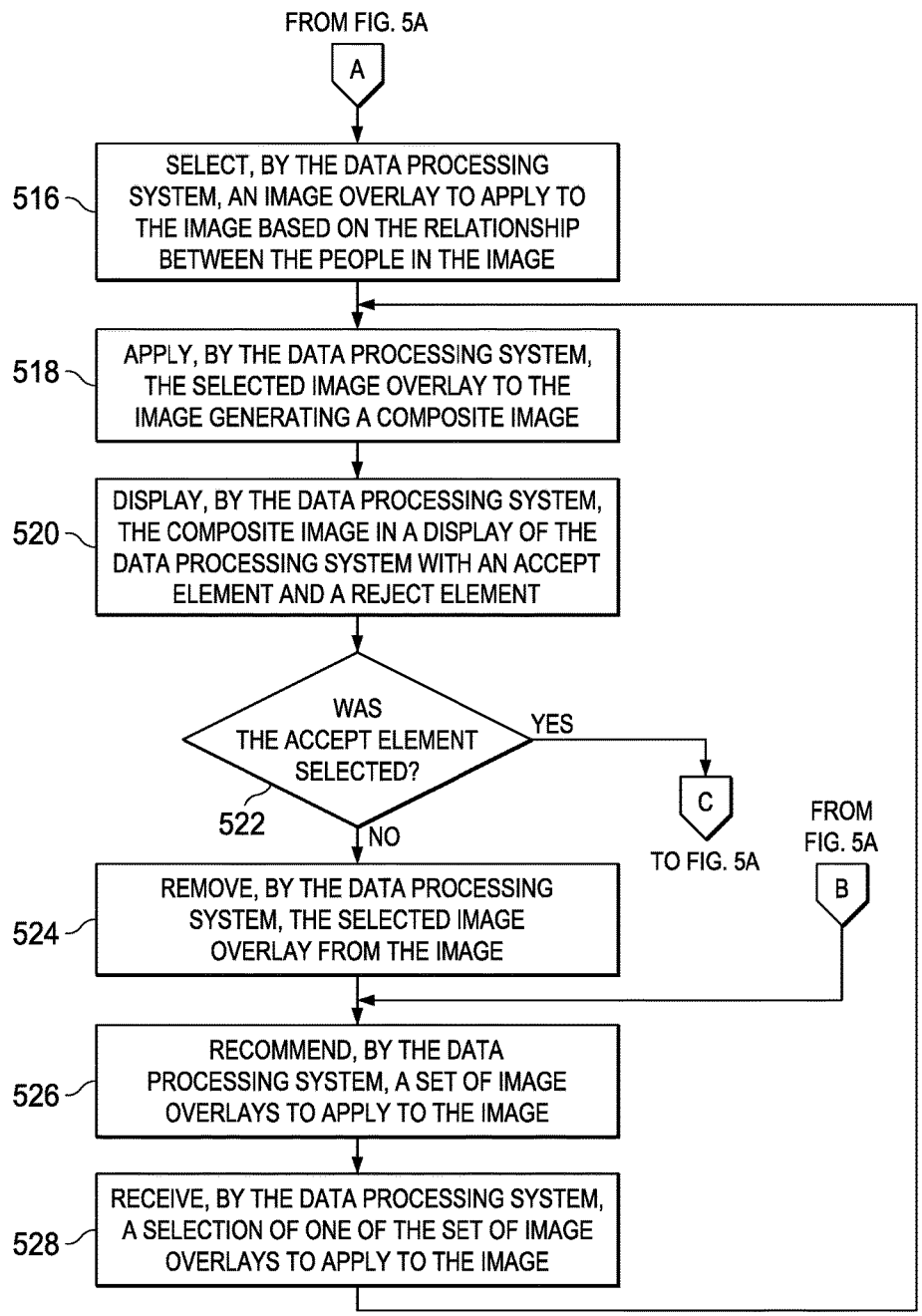

With reference now to FIGS. 5A-5B, a flowchart illustrating a process for applying an image overlay to an image is shown in accordance with an illustrative embodiment. The process shown in FIGS. 5A-5B may be implemented in a data processing system, such as, for example, client 110 in FIG. 1 or data processing system 200 in FIG. 2.

The process begins when the data processing system receives an input to capture an image using an imaging device of the data processing system (step 502). The imaging device may be, for example, imaging unit 210 in FIG. 2. In response to receiving the input at step 502, the data processing system captures the image, such as image 222 in FIG. 2 (step 504).

Subsequently, the data processing system makes a determination as to whether people are in the image (step 506). If the data processing system determines that no people are in the image, no output of step 506, then the data processing system stores the image (step 508). Thereafter, the process terminates.

If the data processing system determines that people are in the image, yes output of step 506, then the data processing system identifies the people in the image (step 510). In addition, the data processing system searches a set of one or more data sources to find one or more commonalities between the people in the image (step 512). The set of data sources may be, for example, online social media data sources and/or user profile data sources.

Afterward, the data processing system makes a determination as to whether the data processing system is able to identify a relationship between the people in the image based on finding one or more commonalities between the people (step 514). If the data processing system is able to identify a relationship between the people in the image based on finding one or more commonalities between the people, yes output of step 514, then the data processing system selects an image overlay to apply to the image based on the relationship between the people in the image (step 516). Further, the data processing system applies the selected image overlay to the image generating a composite image, such as composite image 228 in FIG. 2 (step 518).

Then, the data processing system displays the composite image in a display of the data processing system with an accept element and a reject element (step 520). The data processing system makes a determination as to whether the accept element was selected (step 522). If the data processing system determines that the accept element was selected, yes output of step 522, then the process returns to step 508 where the data processing system saves the composite image. If the data processing system determines that the reject element was selected, no output of step 522, then the data processing system removes the selected image overlay from the image (step 524). Thereafter, the process proceeds to step 526.

Returning again to step 514, if the data processing system is not able to identify a relationship between the people in the image, no output of step 514, then the data processing system recommends a set of image overlays to apply to the image (step 526). The recommended set of image overlays may be, for example, a set of general or generic image overlays or a set of default image overlays. Alternatively, the recommended set of image overlays may be based on one or more other factors, such as, for example, geographic location of where the image was captured. Subsequently, the data processing system receives a selection of one of the set of image overlays to apply to the image (step 528). Thereafter, the process returns to step 518 where the data processing system applies the selected image overlay to the image.

Figure 6:
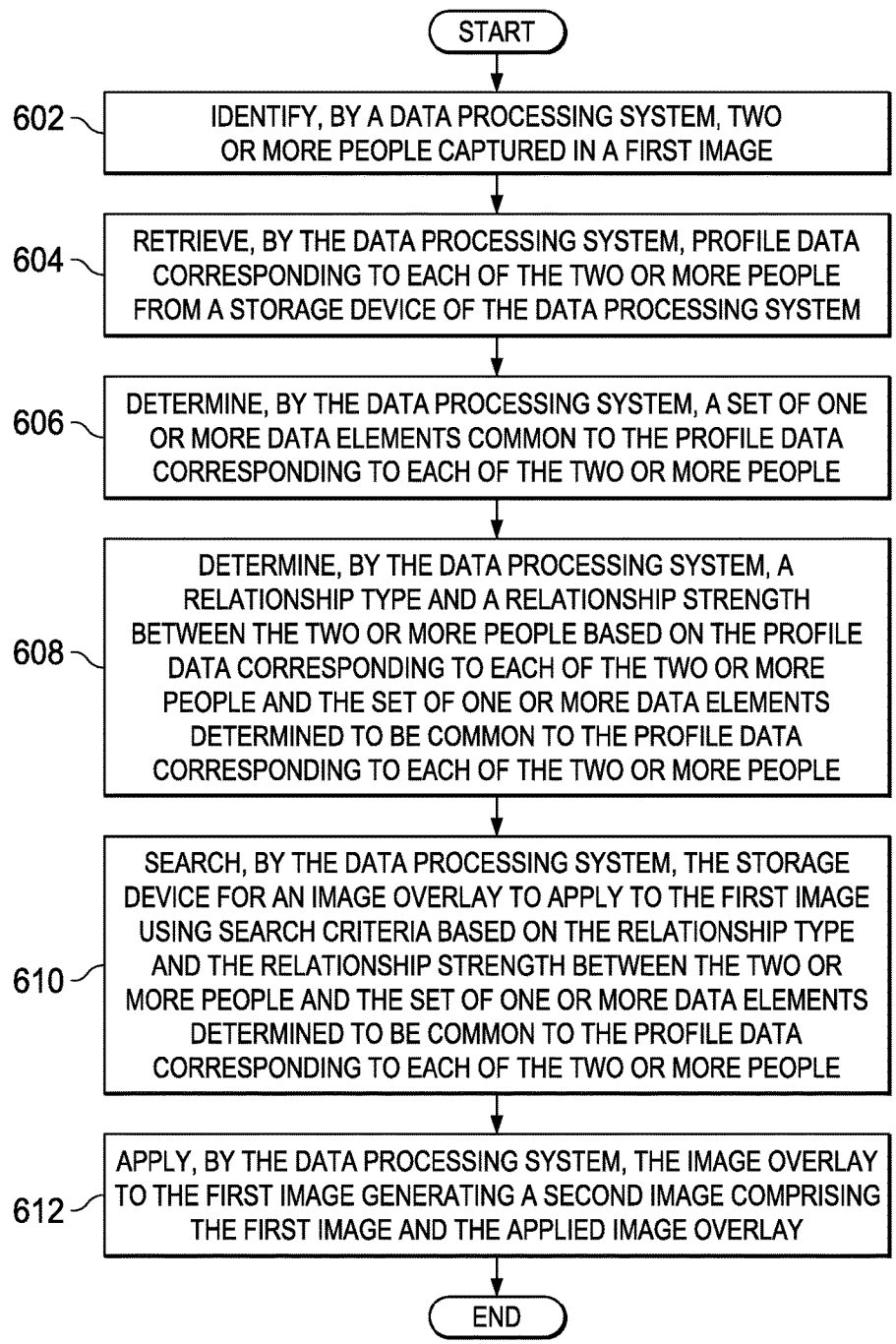
FIG. 6 is a flowchart illustrating a process for searching for an image overlay to apply to an image based on criteria in accordance with an illustrative embodiment.

With reference now to FIG. 6, a flowchart illustrating a process for searching for an image overlay to apply to an image based on criteria is shown in accordance with an illustrative embodiment. The process shown in FIG. 6 may be implemented in a data processing system, such as, for example, client 110 in FIG. 1 or data processing system 200 in FIG. 2.

The process begins when the data processing system identifies two or more people captured in a first image (step 602). Afterward, the data processing system retrieves profile data corresponding to each of the two or more people from a storage device of the data processing system (step 604).

Further, the data processing system determines a set of one or more data elements common to the profile data corresponding to each of the two or more people (step 606). Furthermore, the data processing system determines a relationship type and a relationship strength between the two or more people based on the profile data corresponding to each of the two or more people and the set of one or more data elements determined to be common to the profile data corresponding to each of the two or more people (step 608). Then, the data processing system searches the storage device for an image overlay to apply to the first image using search criteria based on the relationship type and the relationship strength between the two or more people and the set of one or more data elements determined to be common to the profile data corresponding to each of the two or more people (step 610). Subsequently, the data processing system applies the image overlay to the first image generating a second image comprising the first image and the applied image overlay (step 612). Thereafter, the process terminates.

Thus, illustrative embodiments of the present invention provide a computer-implemented method, data processing system, and computer program product for selecting, recommending, and applying an image overlay to an image based on a relationship between the people identified in the image. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for applying an image overlay to an image, the computer-implemented method comprising:

determining, by a data processing system, a relationship type and a relationship strength of a relationship between two or more people identified in a first image based on profile data corresponding to each of the two or more people, a set of data elements determined to be common to the profile data corresponding to each of the two or more people, and information posted in a set of social media sources by the two or more people;

selecting, by the data processing system, an image overlay to apply to the first image based on the relationship type and the relationship strength of the relationship between the two or more people and the set of data elements determined to be common to the profile data corresponding to each of the two or more people; and applying, by the data processing system, the image overlay to the first image to generate a second image that is a composite image that includes both the first image and the applied image overlay, wherein the applied image overlay comprises textual content and graphical content that indicate the relationship between the two or more people;

displaying, by the data processing system, the second image with an accept element and a reject element;

responsive to the data processing system receiving a selection of the reject element, removing, by the data processing system, the applied image overlay from the first image; and responsive to the data processing system removing the applied image overlay from the first image, displaying, by the data processing system, a set of recommended image overlays to apply to the first image, wherein the data processing system generates a new image overlay for the first image based on selected content from two or more different overlays.

2. The computer-implemented method of claim 1, wherein the data processing system identifies the two or more people in the first image using at least one of facial recognition and metadata attached to the image identifying the two or more people.

3. The computer-implemented method of claim 1, wherein the first image is a still photographic image.

4. The computer-implemented method of claim 1, wherein the first image is a video image.

5. The computer-implemented method of claim 1, wherein the image overlay is an animated image overlay.

6. The computer-implemented method of claim 1, wherein the profile data corresponding to each of the two or more people includes one or more of a duration of a relationship between the two or more people, relationships with other people, a relationship identifier corresponding to the two or more people, life events corresponding to the two or more people, educational institutions corresponding to the two or more people, and organizations corresponding to the two or more people.

7. A data processing system for applying an image overlay to an image, the data processing system comprising:
    a bus system;
    a storage device connected to the bus system, wherein the storage device stores program instructions; and
    a processor connected to the bus system, wherein the processor executes the program instructions to:
        determine a relationship type and a relationship strength of a relationship between two or more people identified in a first image based on profile data corresponding to each of the two or more people, a set of data elements determined to be common to the profile data corresponding to each of the two or more people, and information posted in a set of social media sources by the two or more people;
        select an image overlay to apply to the first image based on the relationship type and the relationship strength of the relationship between the two or more people and the set of data elements determined to be common to the profile data corresponding to each of the two or more people;
        apply the image overlay to the first image to generate a second image that is a composite image that includes both the first image and the applied image overlay, wherein the applied image overlay comprises textual content and graphical content that indicate the relationship between the two or more people;
        display the second image with an accept element and a reject element;
        remove the applied image overlay from the first image in response to receiving a selection of the reject element; and
        responsive to removing the applied image overlay from the first image, display a set of recommended image overlays to apply to the first image, wherein the data processing system generates a new image overlay for the first image based on selected content from two or more different overlays.

8. A computer program product for applying an image overlay to an image, the computer program product comprising a computer readable storage medium having program instructions embodied therewith, the program instructions executable by a data processing system to cause the data processing system to perform a method comprising:
    determining, by the data processing system, a relationship type and a relationship strength of a relationship between two or more people identified in a first image based on profile data corresponding to each of the two or more people, a set of data elements determined to be common to the profile data corresponding to each of the two or more people, and information posted in a set of social media sources by the two or more people;
    selecting, by the data processing system, an image overlay to apply to the first image based on the relationship type and the relationship strength of the relationship between the two or more people and the set of data elements determined to be common to the profile data corresponding to each of the two or more people;
    applying, by the data processing system, the image overlay to the first image to generate a second image that is a composite image that includes both the first image and the applied image overlay, wherein the applied image overlay comprises textual content and graphical content that indicate the relationship between the two or more people;
    displaying, by the data processing system, the second image with an accept element and a reject element;
    responsive to the data processing system receiving a selection of the reject element, removing, by the data processing system, the applied image overlay from the first image; and
    responsive to the data processing system removing the applied image overlay from the first image, displaying, by the data processing system, a set of recommended image overlays to apply to the first image, wherein the data processing system generates a new image overlay for the first image based on selected content from two or more different overlays.

9. The computer program product of claim 8, wherein the data processing system identifies the two or more people in the first image using at least one of facial recognition and metadata attached to the image identifying the two or more people.

10. The computer program product of claim 8, wherein the first image is a video image.

* * * * *